(12) United States Patent
Itkin et al.

(10) Patent No.: US 12,260,007 B2
(45) Date of Patent: Mar. 25, 2025

(54) SECURE FLASH CONTROLLER

(71) Applicant: MELLANOX TECHNOLOGIES, LTD., Yokneam (IL)

(72) Inventors: Yuval Itkin, Zoran (IL); Nir Eilam, Haifa (IL)

(73) Assignee: Mellanox Technologies, Ltd, Yokneam (IL)

( * ) Notice: Subject to any disclaimer, the term of this patent is extended or adjusted under 35 U.S.C. 154(b) by 31 days.

(21) Appl. No.: 18/309,851

(22) Filed: May 1, 2023

(65) Prior Publication Data
US 2023/0274037 A1 Aug. 31, 2023

Related U.S. Application Data

(63) Continuation-in-part of application No. 17/013,693, filed on Sep. 7, 2020, now Pat. No. 11,681,635.

(51) Int. Cl.
*G06F 21/79* (2013.01)
*G06F 12/14* (2006.01)
*G06F 21/60* (2013.01)

(52) U.S. Cl.
CPC .......... *G06F 21/79* (2013.01); *G06F 12/1441* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 8,589,700 B2 | 11/2013 | Herman et al. | |
| 8,984,088 B2 | 3/2015 | Umezuki | |
| 10,057,760 B2 | 8/2018 | Yang et al. | |
| 11,681,635 B2 | 6/2023 | Itkin et al. | |
| 2006/0075258 A1* | 4/2006 | Adamson | G06F 21/6209 713/189 |
| 2011/0041046 A1* | 2/2011 | Kang | G06K 19/073 714/E11.032 |
| 2012/0179776 A1 | 7/2012 | Umezuki | |

(Continued)

FOREIGN PATENT DOCUMENTS

WO 2014123372 A1 8/2014

OTHER PUBLICATIONS

Dworkin, "Recommendation for Block Cipher Modes of Operation: Galois/Counter Mode (GCM) and GMAC," Computer Security, NIST Special Publication 800-38D, National Institute of Standards and Technology, U.S. Department of Commerce, pp. 1-39, Nov. 2007.

(Continued)

*Primary Examiner* — Stephanie Wu
(74) *Attorney, Agent, or Firm* — Meitar Patents Ltd.; Daniel Kligler

(57) ABSTRACT

A computing device includes a non-volatile memory (NVM) interface and a processor. The NVM interface is to communicate with an NVM. The processor is to store in the NVM at least a Type-Length-Value (TLV) record including one or more encrypted fields and one or more non-encrypted fields, the non-encrypted fields including at least a validity indicator of the TLV record, to read the TLV record from the NVM, and to invalidate the TLV record by modifying the validity indicator stored in the non-encrypted fields, without decryption of any of the encrypted fields.

16 Claims, 6 Drawing Sheets

(56) References Cited

U.S. PATENT DOCUMENTS

| | | | |
|---|---|---|---|
| 2014/0365785 A1* | 12/2014 | Deforest | G06F 12/0246 |
| | | | 713/193 |
| 2015/0242332 A1* | 8/2015 | Kamath | G06F 12/1408 |
| | | | 713/193 |
| 2016/0277188 A1 | 9/2016 | Quinn et al. | |
| 2017/0097773 A1* | 4/2017 | Camp | G06F 12/0246 |
| 2017/0111330 A1 | 4/2017 | Mosko et al. | |
| 2018/0288127 A1 | 10/2018 | Zaidi et al. | |
| 2018/0332009 A1* | 11/2018 | Lange | H04L 63/0428 |
| 2019/0238312 A1 | 8/2019 | Dickens, III et al. | |
| 2019/0238313 A1 | 8/2019 | Austin | |
| 2020/0045263 A1* | 2/2020 | Uchimura | H04N 5/913 |

OTHER PUBLICATIONS

Yu et al., "Walloc: An Efficient Wear-Aware Allocator for Non-Volatile Main Memory", IEEE 34th International Performance Computing and Communications Conferene (IPCCC), pp. 1-8, Dec. 2015.

* cited by examiner

SECURE FLASH CONTROLLER

CROSS-REFERENCE TO RELATED APPLICATIONS

This application is a continuation-in-part of U.S. patent application Ser. No. 17/013,693, filed Sep. 7, 2020, whose disclosure is incorporated herein by reference.

FIELD OF THE INVENTION

The present invention relates generally to computer systems, and particularly to methods and systems for handling data storage in computer non-volatile memory.

BACKGROUND OF THE INVENTION

Computer systems often comprise non-volatile memory (NVM) such as a Flash memory that is used for data storage. While providing large storage area at relatively low cost, Flash memories have inherent limitations, including erasure in blocks, a limited number of erase/program cycles and vulnerability to security attacks.

PCT International Publication WO 2014/123372 describes a Flash Translation Layer (FTL) design framework with logs for data, mapping and checkpoint, which supports error recovery, including a first log for processing data; a second log for processing mapping information; and a third log for processing checkpoint information, wherein the first and second logs can recover errors by using the checkpoint information.

U.S. Pat. No. 8,589,700 describes systems and methods for whitening, encrypting and managing data for storage in non-volatile memories, including a system-on-a-chip (SoC) and a non-volatile memory, wherein the SoC includes SoC control circuitry and a memory interface that acts as an interface between the SoC control circuitry and the non-volatile memory; the SoC can also include an encryption module; the memory interface can direct the encryption module to whiten all types of data prior to storage in the non-volatile memory, including sensitive data, non-sensitive data, and memory management data.

SUMMARY OF THE INVENTION

An embodiment of the present invention that is described herein provides a computing device including a non-volatile memory (NVM) interface and a processor. The NVM interface is to communicate with an NVM. The processor is to store in the NVM at least a Type-Length-Value (TLV) record including one or more encrypted fields and one or more non-encrypted fields, the non-encrypted fields including at least a validity indicator of the TLV record, to read the TLV record from the NVM, and to invalidate the TLV record by modifying the validity indicator stored in the non-encrypted fields, without decryption of any of the encrypted fields.

Typically, the processor is to store the non-encrypted fields in a plaintext header of the TLV record, and the encrypted fields in an encrypted payload of the TLV record.

In some embodiments, the encrypted fields include data encrypted with an initialization vector (IV) that depends at least on a random nonce, and the processor is to store the random nonce in the non-encrypted fields of the TLV record. In an example embodiment, the IV further depends on an address in which the TLV record is stored in the NVM. In a disclosed embodiment, the processor is to update the TLV record by storing an updated version of the TLV record in a different address in the NVM, including replacing the random nonce with a different random nonce. In an embodiment, the processor is to re-generate the random nonce at least on reset of the processor, for use in encrypting subsequent TLV records.

In some embodiments, the processor is to store an authentication tag in the non-encrypted fields, and, upon reading the TLV record, authenticate the TLV record using the stored authentication tag. In an example embodiment, the authentication tag is calculated over a payload of the TLV record and over at least a part of a header of the TLV record.

In some embodiments, the NVM includes a Flash memory.

There is additionally provided, in accordance with an embodiment that is described herein, a method including storing in a non-volatile memory (NVM) at least a Type-Length-Value (TLV) record including one or more encrypted fields and one or more non-encrypted fields, the non-encrypted fields including at least a validity indicator of the TLV record. The TLV record is read from the NVM. The TLV record is invalidated by modifying the validity indicator stored in the non-encrypted fields, without decryption of any of the encrypted fields.

The present invention will be more fully understood from the following detailed description of the embodiments thereof, taken together with the drawings in which:

DETAILED DESCRIPTION OF EMBODIMENTS

Overview

Figure 1A:
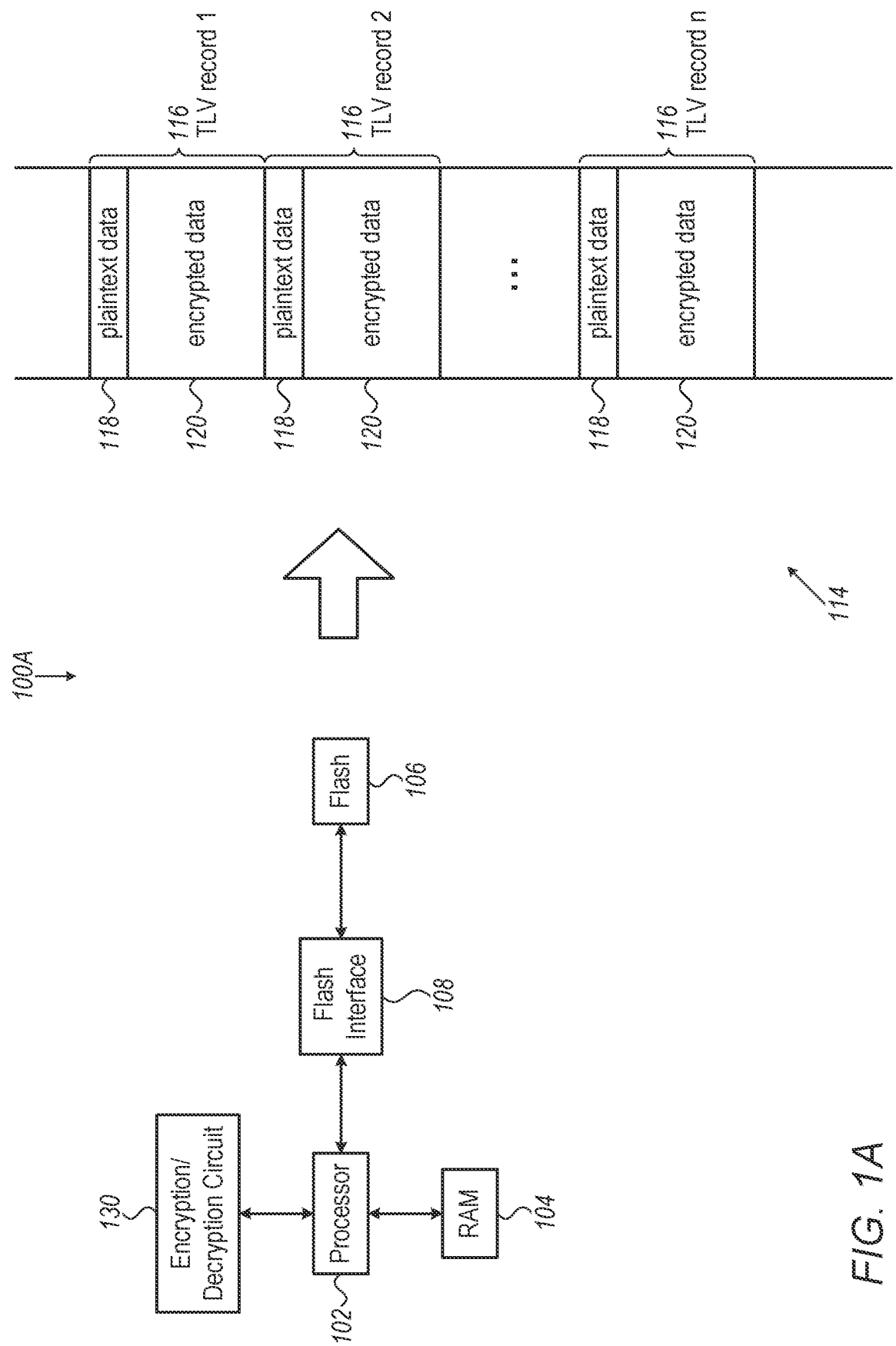
FIG. 1A is a block diagram that schematically illustrates a secure Flash controller, in accordance with an embodiment of the present invention.

Computer systems, which will also be referred to as computing devices, typically comprise a processor (such as a Central Processing Unit (CPU), a Graphic Processing Unit (GPU) or a Microcontroller Computer (MCU)), a primary storage (e.g., Random Access Memory (RAM)), and, often, a non-volatile-memory (NVM) secondary storage, typically for storing program code (e.g., Firmware) and data records. A popular type of NVM, providing a large non-volatile storage area at relatively low cost, is a Flash memory. Flash memories, however, have some inherent limitations in terms of access, aging and vulnerability to security attacks.

Access to a Flash memory by a processor, e.g., a Central Processing Unit (CPU) or Flash controller, is a-symmetric in terms of read vs. write and, in write, in terms of writing logic-0 vs. writing logic-1. While reading is serial and relatively fast, writing, referred to as Programming, as well as Erasing, is much slower. In a typical Flash device, while any bit can be individually programmed to a first binary value (e.g., logic 0), programming to the second binary value (e.g., logic 1) must be done on larger blocks of memory, which are referred to as Pages (programming a page with the second binary value is referred to as Erasing the page). Consequently, to program a page in Flash, the processor typically first erases the page, and then programs the desired data.

To change a part of a pages in the Flash, the processor typically copies the page to a Random-Access Memory (RAM), modifies the part that is to be programmed, erases the page and then reprograms the erased page from RAM.

Aging (also referred to as "wear") is typically defined as—the number of times that Flash cells can be reliably programmed/erased ("P/E cycles"). A typical limit may be 100,000 P/E cycles. If the same page is repeatedly programmed and erased, the life cycle of the page may terminate (and, consequently, the Flash device deemed non-functional) although the P/E cycle count of other pages may be low. When one or more of the Flash pages nears the P/E cycle limit, the reliability of the Flash device severely decreases.

Vulnerability to security attacks. RAMS typically lose storage once the power supply is interrupted, and, hence, are less vulnerable to security attacks; Flash, in contrast, can be read and/or written when the system is turned off; In particular, Flash memories that are external to the computer systems (e.g., Flash devices that plug to the computer system through a Universal Serial Bus (USB) connector) must be protected by cryptographic techniques, which may include encryption and/or authentication.

To mitigate the access and aging limitations, Flash data may be stored in Type-Length-Value (TLV) records, wherein Type typically comprises a TLV status indication field, and data type, Length is the length of the TLV record and Value is the TLV data ("data value"). The indication fields allow adding multiple new records as well as invalidating obsolete records using programming operations, minimizing the number of erase cycles.

To provide security, the processor may encrypt the TLV records prior to programming. However, when TLV records are encrypted, the mechanism described above may fail, since data encryption increases the entropy of the encrypted data and may change all bits.

Embodiments according to the present invention provide for methods and systems wherein data is securely encrypted when stored in Flash memory, and yet TLV record structure is maintained, decreasing the number of erase cycles and, hence, extending the lifespan and the reliability of the Flash device.

In the disclosed embodiments, each TLV record comprises one or more encrypted fields and one or more non-encrypted fields. In an embodiment, fields of the TLV records that are sensitive may be encrypted, whereas insensitive fields may be stored with no encryption (will be referred to as "plaintext fields"; the non-encrypted data will be referred to as "plaintext", stored in "plaintext fields"). In an embodiment, the encrypted fields comprise the data value and the data type, whereas the plaintext fields comprise the indication fields, the length and, sometimes, some of the attributes.

In particular, the processor typically does not encrypt bits that indicate whether the TLV record is valid or invalid. When using this format, the processor is able to invalidate obsolete TLV records, and verify the validity of TLV records, using conventional Flash operations and without having to decrypt information. More generally, encrypting the data while keeping metadata as plaintext is helpful for simplifying management tasks of the processor.

The disclosed techniques therefore extend the life of the Flash device by reducing the number of erase cycles, while maintaining critical data protection. Since fewer encryption and decryption operations are performed, storage throughput and latency can be improved, and power consumption is reduced.

System Description

FIG. 1A is a block diagram that schematically illustrates a secure Flash controller 100A, in accordance with an embodiment of the present invention. Flash controller 100A, which is sometimes referred to as a Computing Device, comprises a processor 102 (such as a CPU, GPU or MCU); a Random-Access Memory (RAM) 104, configured to temporarily sore data and/or program code; and a Flash interface 108. Flash interface 108 is configured to communicate with a non-volatile memory 106 such as a Flash memory, which stores data records.

According to the example embodiment illustrated in FIG. 1A, Processor 102 communicates with Flash 106 through Flash Interface circuit 108; in some embodiments, Flash 106 supports atomic operations only and Flash Interface 108 may be used to translate Flash erase, program and read operations to atomic Flash operation (e.g., a Processor Flash-program operation may be translated by the Flash Control circuit to a series of program and verify operations, transparently to the processor).

A Flash Storage map 114, on the right-hand-side of the figure, illustrates the structure of the TLV records in Flash 106. Each TLV record 116 comprises one or more plaintext fields 118 that are not encrypted, and one or more encrypted data fields 120. The encrypted data fields are encrypted when written and decrypted when read, using, for example, Advanced Encryption Standard (AES) 256. In an embodiment, the plaintext fields store insensitive data, whereas the encrypted field stores sensitive data.

For fast and secure encryption and/or decryption, Flash controller 100A may further comprise an Encryption/Decryption circuit 130; the processor sends plaintext data and a key to the encryption/decryption circuit, which encrypts the plaintext data and sends the encrypted data back to the processor; to decrypt, the processor sends the encrypted data and a key, and receives the plaintext data.

Figure 1B:
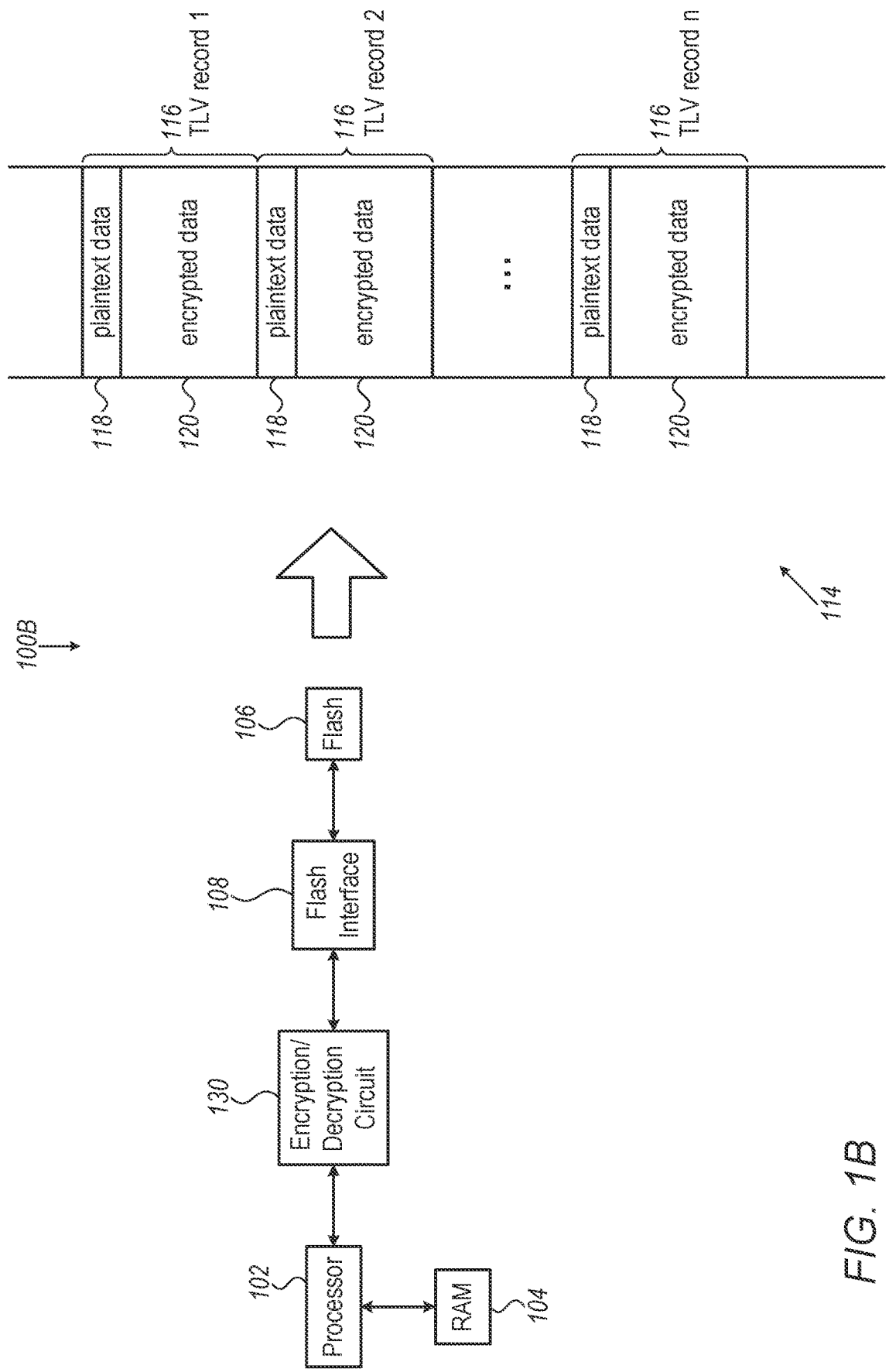
FIG. 1B is a block diagram that schematically illustrates a secure Flash controller, in accordance with another embodiment of the present invention.

FIG. 1B is a block diagram that schematically illustrates a secure Flash controller 100B, in accordance with another embodiment of the present invention. The example embodiment illustrated in FIG. 1B is similar to the example embodiment illustrated in 1A, except that the Encryption/Decryption circuit is placed between the processor and the Flash interface; in Flash Controller 100B the Encryption/Decryption translates between encrypted and plain-text data only.

Thus, according to the example embodiments illustrated in FIGS. 1A and 1B, the sensitive fields of TLV records in a Flash memory are protected by encryption, whereas the non-sensitive fields, including indication fields, are kept in plaintext, allowing a reduced number of erase cycles and hence enhanced reliability.

As would be appreciated, the configurations of Flash controllers 100A and 100B and its components, and TLV records 116 as shown in FIGS. 1A and 1B, are example configurations that are shown purely for the sake of conceptual clarity. Any other suitable configurations can be used in alternative embodiments. For example, in some alternative embodiments, multiple processors and/or multiple RAMs may be used; in an embodiment, processor 102 encrypts and/or decrypts using software, reducing functionality of Encryption/Decryption circuit 130, or eliminating the Encryption/Decryption circuit altogether.

In embodiments, data transfer between encryption/decryption circuit 130, RAM 104 and Flash Interface 108 may be done directly over a shared bus, using, for example, Direct Memory Access (DMA) or any other protocol.

In yet other embodiments, data encryption/decryption comprises authentication, which may be carried out using an additional circuit, using the encryption/decryption circuit, or using software.

The different elements of Flash controller 100, including all components thereof, may be implemented using suitable hardware, such as in an Application-Specific Integrated Circuit (ASIC) or Field-Programmable Gate Array (FPGA), using software, or using a combination of hardware and software elements.

In some embodiments, processor 102 comprises a general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

TLV Record Structure

Figure 2:
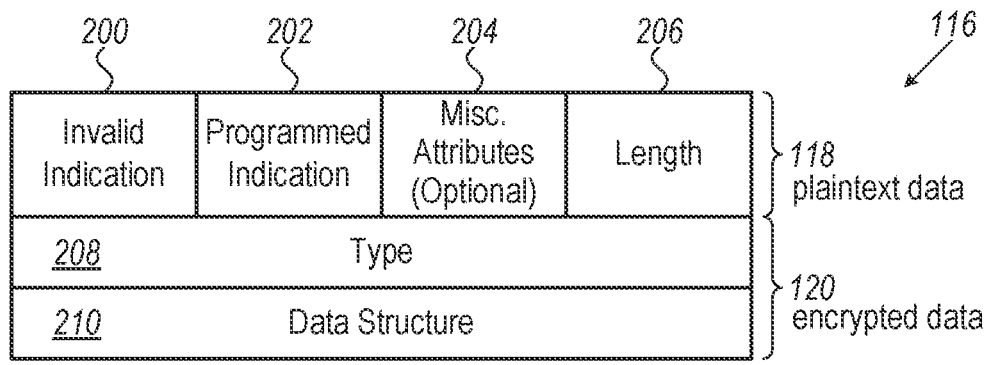
FIG. 2 is a diagram that schematically illustrates the structure of Type-Length-Value (TLV) records, in accordance with an embodiment of the present invention.

FIG. 2 is a diagram that schematically illustrates the structure of TLV records 116, in accordance with an embodiment of the present invention. The TLV record (116, FIGS. 1A and 1B) comprises plaintext fields 118 and encrypted fields 120. According to the example embodiment illustrated in FIG. 2, plaintext fields 118, which are not encrypted, comprise an Invalid indication field 200, a Programmed indication field 202 (Invalid indication field 200 and Programmed indication field 202 typically comprise one bit each), a miscellaneous attributes field 204, which may be used to store record attributes and a length field 206, which indicates the length of the TLV record (e.g., in 32-bit words). (In some embodiments, the plaintext fields are minimized, and miscellaneous attributes field 204 is not used.)

Encrypted fields 120 comprise a Type field 208, which may be used to define the data type (e.g., code, table, etc.) and a Data-Structure field 210 which comprises the data contents of the TLV record.

When a Flash page is erased, all bits are set to an initial value (e.g., logic 1) and, consequently, any TLV records which may have been stored in the page are erased. Erased Programmed and Invalid indicators have a logic-1 value and, hence, are interpreted as not-programmed and not-invalid, respectively.

When the processor checks whether a TLV record is valid, the processor may first verify that the Programmed indication is set, and the Invalid indication is not set. When the processor writes a TLV record, the processor may first verify that the programmed indication of the TLV record is not set. When the processor writes a new TLV record which replaces an existing record, the processor programs the Invalid field of the existing record. (Methods to carry out the read and write operations described above will be presented below, with reference to FIGS. 3 and 4.)

As would be appreciated, the structure of TLV record 116 as shown in FIG. 2, including the various fields thereof, is an example that is shown purely for the sake of conceptual clarity. Any other suitable configurations can be used in alternative embodiments. For example, in some embodiments, additional encrypted and/or non-encrypted fields may be used; in other embodiments, parts of (or all) the miscellaneous Attributes may be encrypted. In some embodiments, the Programmed indication is not needed. When a page is erased, the length field will be set to zero (in an embodiment, the erasure operation sets all bits to Logic-1, and, hence, the length field uses negative logic). Whenever a page is programmed, the length field is set to a non-zero value. Thus, a non-zero length field may be used to indicate that a page is programmed.

We will now describe methods to manage TLV records 116 in Flash memory 106, according to embodiments of the present invention. In embodiments, for faster operation, processor 102 keeps a TLV descriptor table in RAM 104 (FIGS. 1A and 1B). This table may comprise, for each TLV record 116, a pointer for the TLV location in Flash, mirror images of the programmed and invalid indications (in some embodiments, the descriptor table may also include, for example, mirrors of the miscellaneous attribute fields, and plaintext versions of the type fields). It is assumed that TLV records are stored in the Flash memory continuously.

Method Descriptions

Figure 3:
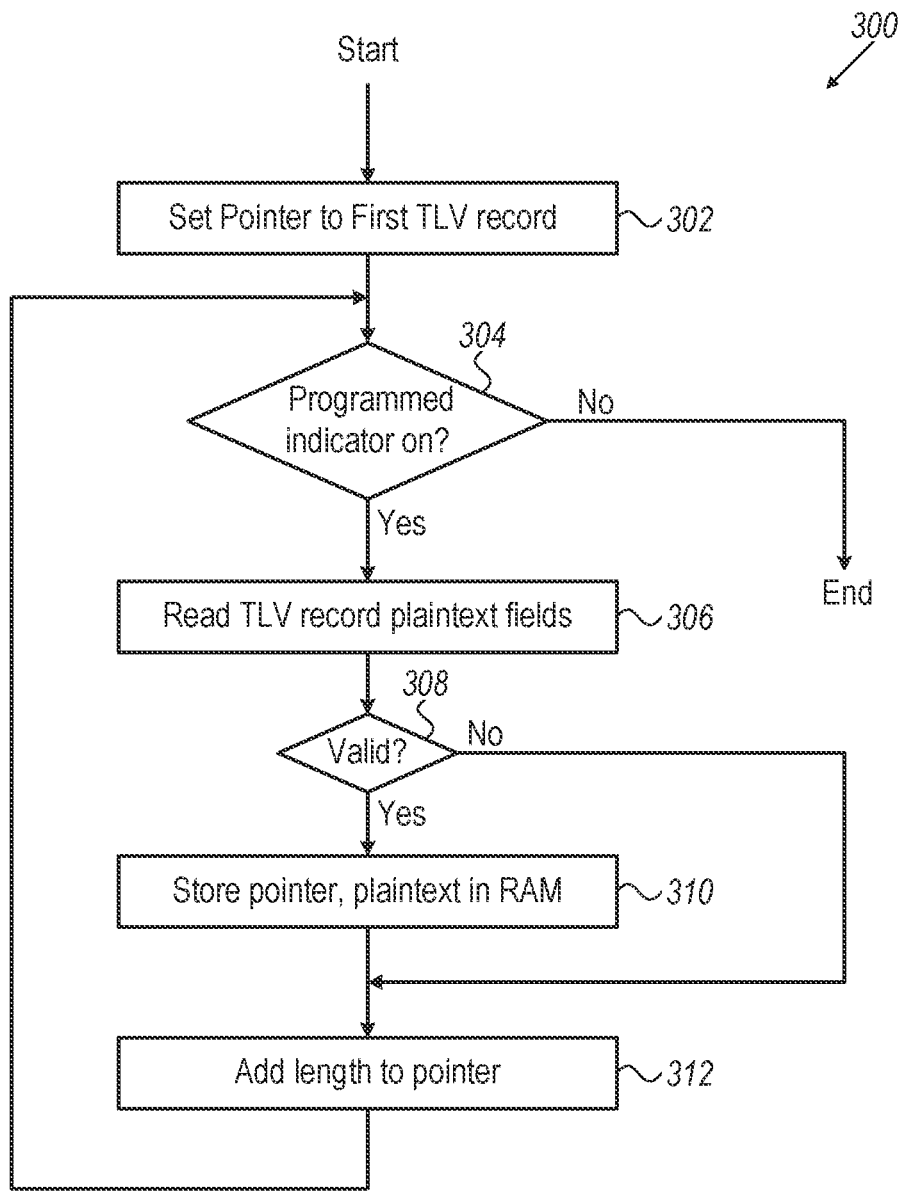
FIG. 3 is a flowchart that schematically illustrates a method for building a TLV descriptor table in RAM, in accordance with an embodiment of the present invention.

FIG. 3 is a flowchart 300 that schematically illustrates a method for building a TLV descriptor table in RAM, in accordance with an embodiment of the present invention. The flowchart is typically executed by processor 102 (FIGS. 1A and 1B) after power-up or other types of hard-reset.

The flow starts at a Set-Pointer step 302, wherein the processor sets a pointer to point at the first TLV record. This location is typically fixed, for example, to the start of the Flash address space. Next, at a Check-Programmed step 304, the processor reads the programmed indication of the TLV record. If the programmed indicator is not set, the current record is the last TLV that is stored in the Flash (as mentioned above, according to the example embodiment illustrated in FIG. 3, TLV records in Flash are contiguous, and the first indication of a non-programmed TLV implies that the previous TLV is the last programmed TLV). If the programmed indicator is set, the processor, in a Read-TLV step 306, reads the plaintext fields of the TLV record and enters a Checking Valid step 308, wherein the processor checks if the INVALID indicator is not set (indicating a valid TLV). If so, the processor will enter a Storing step 310, wherein the processor stores the plaintext of the TLV, including the pointer and, optionally, some other plaintext fields (but not the invalid indicator), in the TLV descriptor table. The processor will then enter an Adding Length step 312.

If, in step 308, the processor identifies that a TLV is marked as Invalid, the processor will skip step 310 and directly enter step 312.

In step 312 the processor adds the length field to the pointer, which will now point to the next TLV record. After step 312 the processor reenters step 304 to examine the next TLV record. If, in step 304, the programmed bit is not set (and, hence, there are no more programmed TLVs in the Flash), the flow ends.

Figure 4:
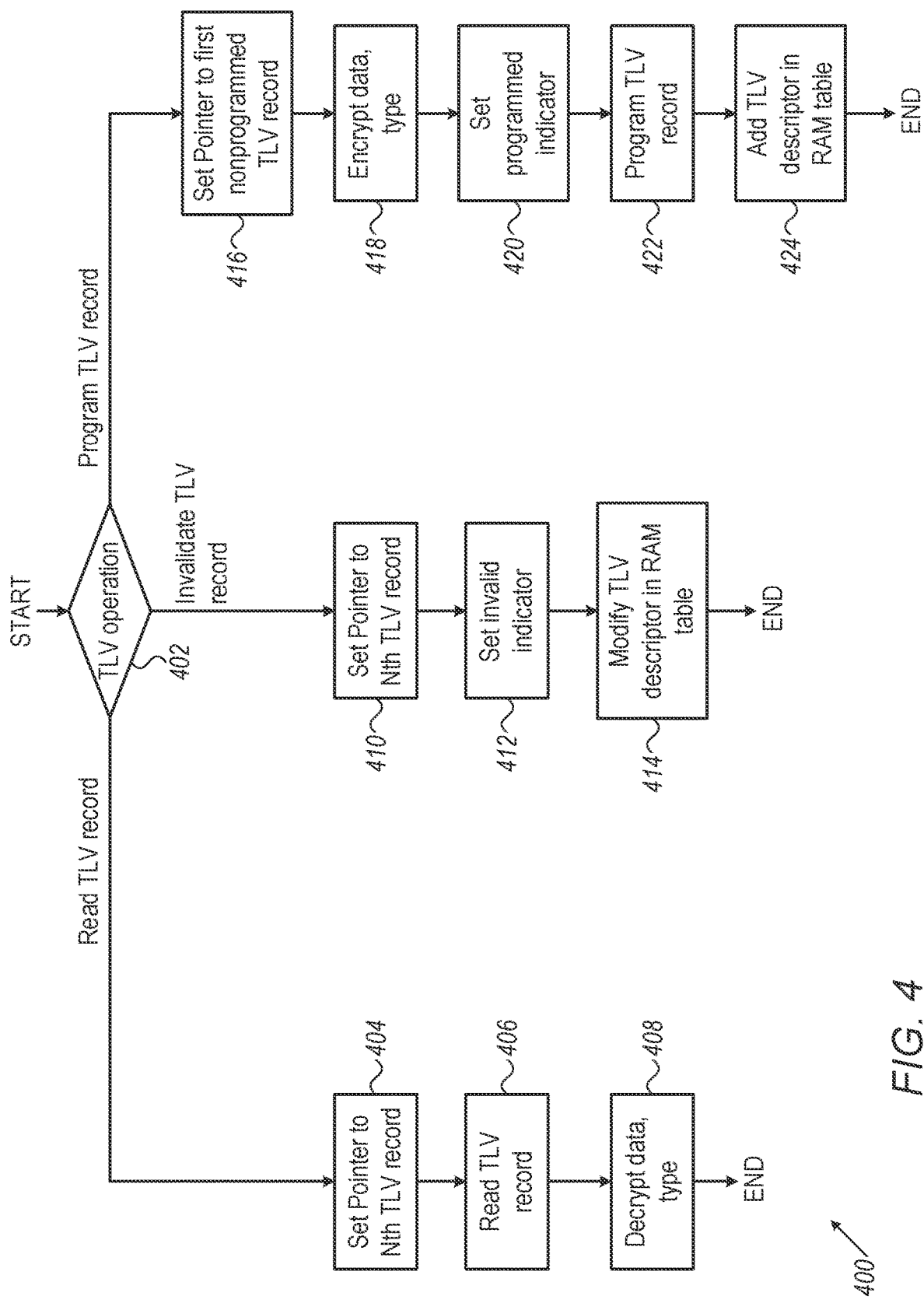
FIG. 4 is a flow chart that schematically illustrates the method to read, program and invalidate a TLV record in the Flash memory, in accordance with an embodiment of the present invention.

FIG. 4 is a flow chart 400 that schematically illustrates a method to read, program and invalidate a TLV record 116 in Flash memory 106, in accordance with an embodiment of the present invention. The flow may be executed by processor 102 (FIGS. 1A and 1B).

The flow starts at a Check Operation step 402, wherein the processor checks which of the three TLV operations should be executed. If the operation is read-TLV record, the processor enters a Set-Pointer step 404 and sets a pointer to the location of the Nth TLV record in the Flash (the location is stored in RAM 104, in the TLV descriptor table). The processor will then, at a Read-TLV step 406, read the TLV record from the Flash; decrypt the encrypted fields in a Decrypt step 408, and end the flow.

If, in step 402, the operation is invalidation of the Nth TLV record, the processor enters a Set-Pointer step 410 and sets the pointer to the location of the Nth TLV record in the Flash (read from the TLV descriptor table). The processor will next, in a Set-Invalid step 412, program the invalid indicator of the TLV record to indicate that the record is not valid and, in a Modify Descriptor step 414, modify the descriptor table to indicate that the Nth TLV record is not valid. The processor will then end the flow.

If, in step 402, the operation is programming of a new TLV record, the processor enters a Set-Pointer step 416 and sets the pointer to the location of the first non-programmed TLV record. The processor then encrypts the encrypted fields in an Encrypt step 418 and, in a Set-Programmed step 420, sets the Programmed indicator to indicate that the current TLV record is programmed. Next, in a Program-TLV step 422, the processor programs the TLV record, including all encrypted and plaintext fields. Lastly, at an Add-Descriptor step 424, the processor adds an entry in the TLV descriptors table which comprises the pointer to the newly added TLV record, and the flow ends.

In summary, the methods described herein with reference to FIGS. 3 and 4 facilitate secure and yet reliable usage of Flash-based TLV records, including maintaining of a descriptor table of Flash TLV records (FIG. 3); and including the reading, programming and invalidating of TLV records (FIG. 4).

As would be appreciated, the methods illustrated in flowcharts 300 and 400 that are described above with reference to FIGS. 4 and 5 are cited by way of example. Methods and flowcharts in accordance with the disclosed techniques are not limited to the description hereinabove.

In alternative embodiments, for example, the order of operations may change, some steps could be executed in parallel and some steps may be embedded in other steps. In some embodiments, some or all the steps of the flowcharts may be executed by Flash Control/Interface 108 (FIGS. 1A and 1B) or by other circuitry.

In some embodiments, the structure of the descriptors table may vary. In an embodiment, there is no TLV descriptor table, and the processor calculates pointers to TLV records by serially reading and summing the lengths of consecutive TLV records.

Secure TLV Record Format with Nonce and Authentication Tag in Header

In some applications, the disclosed computing device (e.g., device 100A of FIG. 1A or device 100B of FIG. 1B) may be subject to a hostile attack. An attack may attempt, for example, to extract information from TLV records stored in Flash memory 106, to change the behavior of the device in unauthorized ways, e.g., by bypassing restrictions, or to perform any other unauthorized action. In an example attack scenario, an attacker may gain direct access to Flash memory 106 and modify TLV records stored therein, or replace Flash memory 106 with another Flash memory 106 comprising different TLV records. In some embodiments, the disclosed computing device (e.g., device 100A of FIG. 1A or device 100B of FIG. 1B) uses a TLV record format, and associated methods, which protect against illegitimate access to Flash memory 106.

The embodiments described below assume that encryption/decryption circuit 130 uses the Galois/Counter Mode (GCM) of the Advanced Encryption Standard (AES) block cipher for encryption and authentication. GCM is specified, for example, in NIST Special Publication 800-38D, entitled "Recommendation for Block Cipher Modes of Operation: Galois/Counter Mode (GCM) and GMAC," November, 2007, which is incorporated herein by reference. The use of GCM, however, is not mandatory. Any other suitable encryption and authentication scheme can be used in alternative embodiments.

When operating in accordance with GCM, circuit 130 encrypts plaintext, and decrypts ciphertext, using (i) a key and (ii) an Initialization Vector (IV). Also in accordance with GCM, circuit 130 may sign and authenticate data by calculating a cryptographic authentication tag over the data.

In some embodiments, when generating a TLV record, processor 102 stores the following in the header of the TLV record:

- A random nonce that is used (in combination with other parameters described below) for calculating the IV for encrypting the data stored in the TLV record.
- ■A GCM authentication tag.

Using these parameters, as will be explained below, processor 102 is able to verify whether a TLV record stored in Flash memory 106 is authentic or whether the record has been tampered with.

Figure 5:
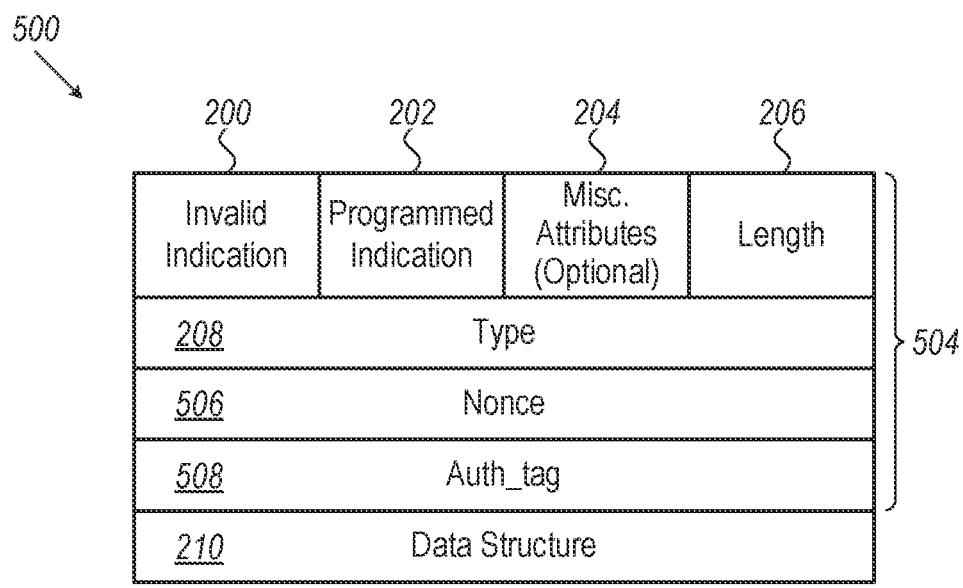
FIG. 5 is a diagram that schematically illustrates the structure of a TLV record, in accordance with an alternative embodiment of the present invention.

FIG. 5 is a diagram that schematically illustrates the structure of a TLV record 500, in accordance with an embodiment of the present invention. This record format may be used by processor 102 in any of the disclosed computing devices for storing TLV records in Flash memory 106. Some of the elements of TLV record 500 are identical to corresponding elements of TLV record 116 of FIG. 2 above, and are therefore numbered with the same reference numerals. In the embodiment of FIG. 5, TLV record 500 comprises a header 504 that is typically non-encrypted. A payload comprising data structure 210 follows header 504. The payload comprises the encrypted data of the TLV record.

In the present non-limiting example, header 504 comprises invalid indication field 200, programmed indication field 202, miscellaneous attributes field 204, length field 206 and type field 208, similarly to the format seen in FIG. 2 above. Note that, in contrast to the format of FIG. 2, in the present format type field 208 is typically not encrypted.

In addition, header 504 further comprises a nonce 506 and an authentication tag 508. Nonce field 506 comprises a random nonce that is used in the calculation of the IV used for encrypting and authenticating the data of the TLV record. Authentication tag field 508 comprises the GCM authentication tag used for authenticating the data of the TLV record. Typically, the entire header 504, including nonce 506 and authentication tag 508, is not encrypted.

In an embodiment, authentication tag 508 is calculated not only over the encrypted data (the payload) of the TLV record, but also over at least part of non-encrypted header 504. In GCM, certain data can be defined as "Additional Authenticated Data" (AAD). Data defined as AAD is authenticated but not encrypted by circuit 130. In an embodiment, processor 102 uses the AAD feature for including at least part of header 504 in the calculation of authentication tag 508.

In an example embodiment, the entire header 504 with the exception of nonce 506 and authentication tag 508 is defined as AAD. In other embodiments, any header field (typically with the exception of valid field 200, length field 206 and type field 208) may be either AAD or be encrypted. In alternative embodiments, processor 102 may define any suitable part of header 504 as AAD.

In some embodiments, Flash memory 130 is divided into multiple partitions. Each TLV record is written to a selected address in a selected partition. Since Flash memory cannot be overwritten in-place, updating a TLV record is performed by writing an updated version of the record to a new address (in the same partition or in a different partition) and invalidating the previous version of the record. Over time, the active partitions in Flash memory 106 accumulate a growing number of invalid records. Processor 120 typically runs a "garbage collection" process that compacts partitions having a mixture of valid records and invalid records. To compact a partition, processor 102 copies the valid records from the partition to a fresh partition. The former partition is then erased and returned to service as a new partition.

In the present embodiment, each partition is assigned a randomly generated respective partition-specific IV that is used, in combination with other parameters, for encrypting and signing the TLV records stored in the partition. The randomly generated partition-specific IV is randomized to a new value before writing the first record to that partition, and typically also on each "garbage collection" cycle.

Figure 6:
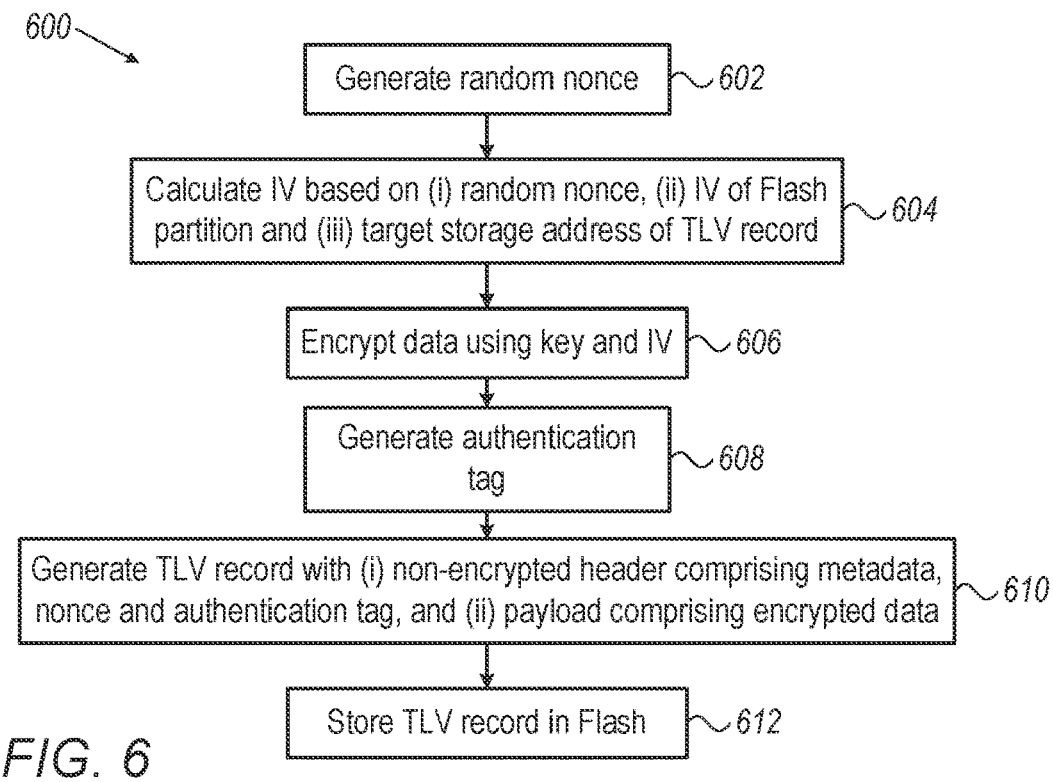
FIG. 6 is a flow chart that schematically illustrates a method for producing and writing a TLV record, in accordance with an embodiment of the present invention.

FIG. 6 is a flow chart that schematically illustrates a method for producing and writing a TLV record, in accordance with an embodiment of the present invention. The method may be carried out by any of the disclosed computing devices. The method begins with generation of a random nonce, at a nonce generation stage 602. In some embodiments the random nonce is generated by encryption/decryption circuit 130. In other embodiments the random nonce can be generated by a circuit separate from encryption/decryption circuit 130.

At an IV calculation stage 604, circuit 130 calculates an Initialization Vector (IV) that will be used for encrypting the data of the TLV record and for calculating the authentication tag of the TLV record.

Circuit 130 calculates the IV based on (i) the random nonce generated at stage 602, (ii) the partition-specific IV of the partition in which the TLV record is to be stored, and (iii) the target storage address of the TLV record in Flash memory 106. The target address used in the calculation may be a physical address or a logical address. These dependencies ensure that, even if the random nonce is not replaced, the IV will (i) be unique for each TLV record, (ii) change when the data of a given TLV record is updated or copied to a different partition (e.g., as part of "garbage collection") and (iii) change when the data of a given TLV record is written to a different address in the same partition.

In an example implementation, circuit 130 calculates the IV according to the following formula: $IV=MSB_{96}(SHA512(64'b\{nonce\}||32'b\{nv\_partition\_iv\}||32'b\{absolute\ flash\ address\}))$. As seen, the present implementation uses 32-bit addresses, 32-bit partition-specific IVs, a 64-bit nonce and a 96-bit IV. The "||" operator denotes concatenation of binary strings. In this implementation, the calculation uses a total of 128 bits of information (64-bit nonce, 32-bit partition-specific IV, and 32-bit address), and uses the SHA512 hash function to create a new 512-bit binary string. In the new string, each bit depends on all 128 bits of the input data. The calculation then takes only the 96 Most Significant Bits (MSBs) of the new string, to produce the final 96-bit IV. In other embodiments, circuit 130 may calculate the IV using any other suitable calculation.

At an encryption stage 606, circuit 130 encrypts the data of the TLV record using the appropriate key and using the IV calculated at stage 604. At a tag generation stage 608, circuit 130 calculates an authentication tag over the data (and in some embodiments also over at least part of the header) of the TLV record, using the key and the IV calculated at stage 604.

At a record generation stage 608, processor 102 generates the desired TLV record. The TLV record comprises a non-encrypted header that includes metadata fields 502, the random nonce of stage 602 in nonce field 506, and the authentication tag of stage 608 in authentication tag field 508. The TLV record further comprises a payload including the data encrypted at stage 606. At a storage stage 612, processor 102 stores the TLV record in Flash memory 106.

Figure 7:
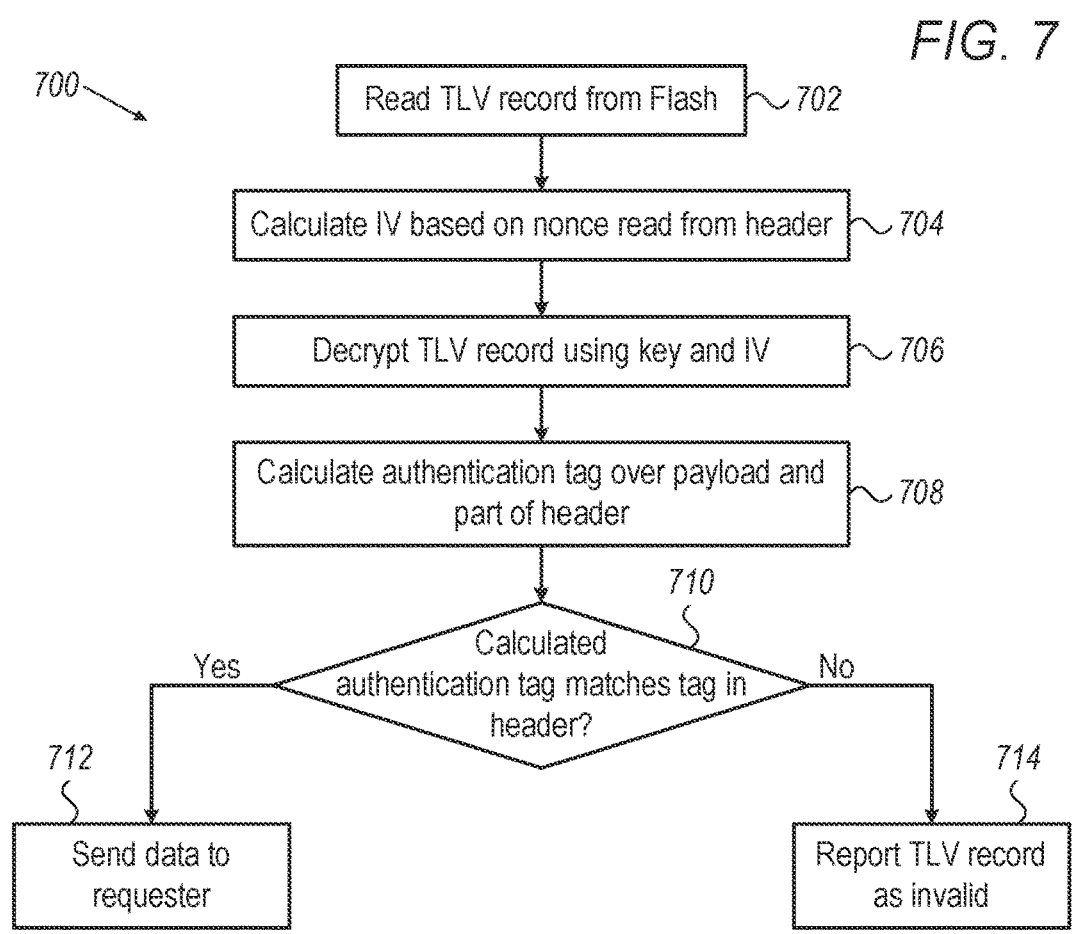
FIG. 7 is a flow chart that schematically illustrates a method for reading a TLV record, in accordance with an embodiment of the present invention.

FIG. 7 is a flow chart that schematically illustrates a method for reading a TLV record, in accordance with an embodiment of the present invention. The method may be carried out by any of the disclosed computing devices. The method begins with processor 102 reading a TLV record from Flash memory 106, at a readout stage 702. The readout is typically performed in response to a request from a certain requestor (e.g., a host).

At an IV calculation stage 704, encryption/decryption circuit 130 calculates an IV based on nonce 506 read from the header of the TLV record (and on the partition-specific IV of the partition from which the TLV record was read, and on the address of the TLV record).

At a decryption stage 706, circuit 130 decrypts the payload of the TLV record using the appropriate key and using the IV calculated at stage 704. At a tag calculation stage 708, circuit 130 calculates an authentication tag over the payload and over part of the header of the TLV record.

At an authentication stage 710, processor 102 compares the authentication tag calculated at stage 708 to authentication tag 508 stored in the header of the TLV record. If the calculated tag is identical to the stored tag, processor 102 sends the decrypted data of the TLV record to the requestor, at an output stage 712. If the calculated tag is different from the stored tag, processor 102 concludes that the TLV record is not trustworthy, and reports the record as invalid, At a failure stage 714.

To ensure sufficient security, processor 102 occasionally replaces the nonce used for encrypting and signing TLV records. In various embodiments, processor 102 may replace the nonce in response to any suitable condition or event. In some embodiments, processor 102 generates a new nonce upon each reset of the processor. Additionally or alternatively, processor 102 generates a new nonce upon each cycle of the "garbage collection" process. Note that these conditions do not preclude the use of a given nonce for encrypting and signing multiple records.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

Although the embodiments described herein mainly address secure Flash, the methods and systems described herein can also be used in other applications, including (but not limited to) any other suitable type of programmable memory (e.g., PROM and EFUSE based memory).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computing device, comprising:
a non-volatile memory (NVM) interface, to communicate with an NVM; and
a processor, to:
store in the NVM at least a Type-Length-Value (TLV) record comprising one or more encrypted fields and one or more non-encrypted fields, the encrypted fields comprising data encrypted with an initialization vector (IV) that depends on an address in which the TLV record is stored in the NVM, and the non-encrypted fields comprising at least a validity indicator of the TLV record;
read the TLV record from the NVM; and
invalidate the TLV record by modifying the validity indicator stored in the non-encrypted fields, without decryption of any of the encrypted fields.

2. The computing device according to claim 1, wherein the processor is to store the non-encrypted fields in a plaintext header of the TLV record, and the encrypted fields in an encrypted payload of the TLV record.

3. The computing device according to claim 1, wherein the IV further depends at least on a random nonce, and wherein the processor is to store the random nonce in the non-encrypted fields of the TLV record.

4. The computing device according to claim 3, wherein the processor is to update the TLV record by storing an updated version of the TLV record in a different address in the NVM, including replacing the random nonce with a different random nonce.

5. The computing device according to claim 3, wherein the processor is to re-generate the random nonce at least on reset of the processor, for use in encrypting subsequent TLV records.

6. The computing device according to claim 1, wherein the processor is to store an authentication tag in the non-encrypted fields, and, upon reading the TLV record, authenticate the TLV record using the stored authentication tag.

7. The computing device according to claim 6, wherein the authentication tag is calculated over a payload of the TLV record and over at least a part of a header of the TLV record.

8. The computing device according to claim 1, wherein the NVM comprises a Flash memory.

9. A method, comprising:
storing in a non-volatile memory (NVM) at least a Type-Length-Value (TLV) record comprising one or more encrypted fields and one or more non-encrypted fields, the encrypted fields comprising data encrypted with an initialization vector (IV) that depends on an address in which the TLV record is stored in the NVM, and the non-encrypted fields comprising at least a validity indicator of the TLV record;
reading the TLV record from the NVM; and
invalidating the TLV record by modifying the validity indicator stored in the non-encrypted fields, without decryption of any of the encrypted fields.

10. The method according to claim 9, wherein storing the TLV record comprises storing the non-encrypted fields in a plaintext header of the TLV record, and the encrypted fields in an encrypted payload of the TLV record.

11. The method according to claim 9, wherein the IV further depends at least on a random nonce, and wherein storing the TLV record comprises storing the random nonce in the non-encrypted fields of the TLV record.

12. The method according to claim 11, and comprising updating the TLV record by storing an updated version of the TLV record in a different address in the NVM, including replacing the random nonce with a different random nonce.

13. The method according to claim 11, wherein the processor is to re-generate the random nonce at least on reset of the processor, for use in encrypting subsequent TLV records.

14. The method according to claim 9, wherein storing the TLV record comprises storing an authentication tag in the non-encrypted fields, and, upon reading the TLV record, authenticating the TLV record using the stored authentication tag.

15. The method according to claim 14, wherein the authentication tag is calculated over a payload of the TLV record and over at least a part of a header of the TLV record.

16. The method according to claim 9, wherein the NVM comprises a Flash memory.

* * * * *